Dec. 14, 1965  W. T. RENTSCHLER  3,223,013
PHOTOGRAPHIC CAMERA WITH BUILT-IN OR ATTACHABLE
DELAYED-ACTION DEVICE
Filed March 4, 1963  2 Sheets-Sheet 1

INVENTOR.
Waldemar T. Rentschler
BY
Arthur A. March
ATTORNEY

Dec. 14, 1965 W. T. RENTSCHLER 3,223,013
PHOTOGRAPHIC CAMERA WITH BUILT-IN OR ATTACHABLE
DELAYED-ACTION DEVICE
Filed March 4, 1963 2 Sheets-Sheet 2

INVENTOR.
Waldemar T. Rentschler
BY
Arthur A. March
ATTORNEY

United States Patent Office 3,223,013
Patented Dec. 14, 1965

3,223,013
PHOTOGRAPHIC CAMERA WITH BUILT-IN OR ATTACHABLE DELAYED-ACTION DEVICE
Waldemar T. Rentschler, Calmbach (Enz), Germany, assignor to Alfred Gauthier, G.m.b.H., Calmbach (Enz), Germany, a corporation of Germany
Filed Mar. 4, 1963, Ser. No. 262,749
Claims priority, application Germany, Mar. 9, 1962, G 34,446
4 Claims. (Cl. 95—53.3)

The present invention relates to a photographic camera with a built-in or attachable delayed-action device for delaying operation of the shutter until a predetermined time after the initiating trigger has been attached.

When carrying out automatic release exposures with cameras having delayed-action shutters, it was found to be a disadvantage that the end of the delay period of the delayed-action is not indicated with sufficient clarity to the photographer. Heretofore, the only means by which the photographer could know the approaching end of the delay period were merely the position of the manually operable cocking lever of the delayed-action device or, possibly, the sound caused by the processes of motion within the shutter during the running down of the exposure. However, the photographer would be able to perceive these indicia of motion only if he followed the operation of the delayed-action device very carefully.

It is the object of the present invention to remedy this defect in photographic cameras with built-in or attachable delayed action devices by making the end of the running-down motion of the delayed-action device clearly visible to the photographer.

In order to solve this problem, the invention includes the arrangement of an operating or control device which is operatively connected to the delayed-action device and which indicates the end of the running-down motion of the delayed-action device by triggering light signals of a lamp.

According to a further proposal of the invention, a control member is provided which operates simultaneously with the delayed-action device and which, at the end of its operation, actuates a contact switch which is arranged in the circuit of the indicating lamp. For this purpose, the control member may be in the form of a disc and may be provided with one or more operating or control cams limited to a specific region of the circumference of the disc. This arrangement has the advantage that it is inexpensive and simple to produce.

In one embodiment of the invention the contact switch is in the form of a leaf spring which, with its free end, engages the control disc and cooperates with a fixed contact pin. The use of such a contact switch is especially advantageous in the case of delayed-action devices which are built into the intra-lens shutter. In the case of delayed-action devices which can be attached to cameras, on the other hand, the contact making can be obtained even more simply by means of a contact switch in the form of a two-armed lever, one arm of which tensionally engages the control disc while the other arm makes contact with the indicating lamp.

In another embodiment, the invention provides that the contact switch of the operating device is connected to an interrupter switch which is located in the circuit of the lamp and which is closed automatically upon release of the delayed-action device. This prevents the indicating lamps from receiving current pulses during the cocking process, whereby the source of energy of the indicating lamp is preserved and conditions for increasing its life are created. A particularly suitable arrangement of an interrupter switch in an intra-lens shutter with built-in delayed-action device is a rotatably positioned one-armed lever which cooperates with the shutter-blade driving ring so that, with the driving ring in inoperative position, the contact of the circuit to the battery is interrupted, but immediately after operation of the delayed-action device has started, the battery circuit is automatically closed.

Furthermore, the interrupter switch may be provided, especially in the case of delayed-action devices which can be attached to the camera, with a movable contact arm, the setting position of which can be so influenced by the release lever of the delayed-action device that, when the delayed-action device is in "Stop" position, the contact to the battery is interrupted but upon release the contact is established automatically.

The lamp indicating the completion of operation of the delayed-action device may be arranged on the front covering plate of the intra-lens shutter or else on the camera case itself. In the case of attachable delayed-action devices, it is recommended, both for production engineering and for functional reasons, that the indicating lamp be built into the housing of the delayed-action device.

Details of the invention will become apparent from the specification that follows and from the accompanying drawings which illustrate various embodiments of the invention.

Figure 1:
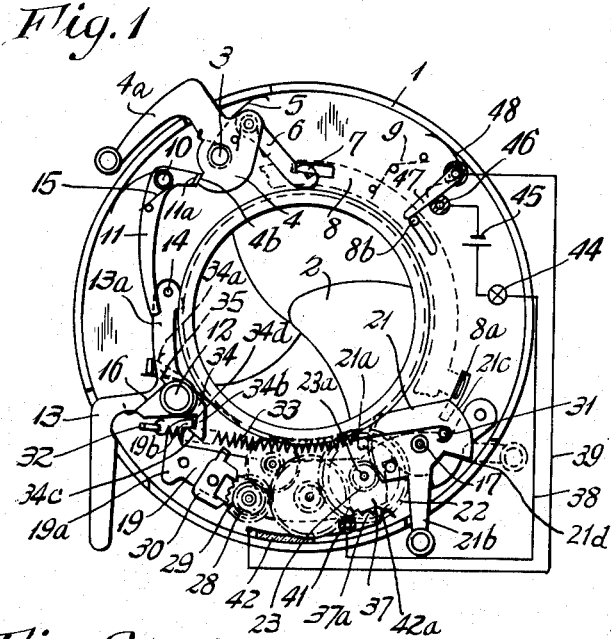
FIG. 1 shows a top view, with the covering plate removed, of the cocked intra-lens shutter of a photographic camera with built-in delayed-action device which is also in cocked position, in connection with a device for operating a lamp indicating the completion of the delay period.

Referring now to the drawings, reference numeral 1 indicates the housing of a photographic intra-lens shutter having means for guiding the shutter blades 2 into open and closed positions. The shutter operating means includes a rotatable cocking shaft 3 having a cocking and driving disc 4 connected rigidly thereto and a driving spring 5 which exerts pressure tending to rotate the disc 4 clockwise. The disc is provided with a cocking lever 4a and carries a driving pawl 6, the free end of which acts on a pin 7 of a shutter-blade driving ring 8 coaxially to the lens axis and rotatable thereabout. The ring 8, in turn, is influenced by a spring 9, which tends to keep it in the starting position shown in FIG. 1.

An arresting lever 11 rotatably positioned on a fixed axis 10 has at one end, a bent-off lug 11a that extends into the path of motion of a projection 4b of the cocking and driving disc 4. The other end of the arresting lever 11 is located in the range of motion of a release lever 13 which is pivotally positioned on a fixed shaft 12 and which carries a driving pin 14 on its arm 13a facing the arresting lever 11. While one spring 15 urges the arresting lever 11 in counterclockwise direction, another spring 16 exerts a clockwise moment of rotation on the release lever 13.

Figure 2:
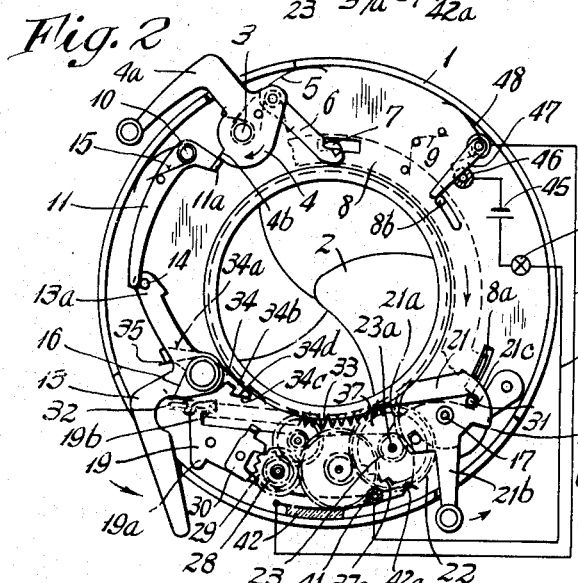
FIG. 2 shows the intra-lens shutter of FIG. 1 after the release while the delayed-action device is operating.

In order to be able to effect not only exposures with direct release, but also exposures with delayed exposure with the above described arrangement of an intra-lens shutter, a delayed-action device is built into the shutter housing 1. This delayed-action device may be fixed or stationary, or, as shown in the embodiment of FIGS. 1 and 2, it may be pivotally positioned about a fixed pin 17 in the shutter housing 1 for the purpose of blocking and releasing its gear members. While the delayed-action device comprises two bearing plates which serve to position its gear members, the top one has been omitted in the drawing for the sake of clarity and only the bottom plate 19 is shown. Rotatably positioned on the pin 17 of the delayed-action device is a driving segment 21, which is provided with a toothed section 21a. A gear chain formed substantially of pinions and gears 22 to 28 and an anchor wheel 29 with escapement anchor 30 associated with said gear chain are connected to the driving segment 21 by way of pinion 23. A ratchet coupling of well known construction which consists of two members relatively rotatable with respect to each other in one direction of rotation only cooperates with the gear 22 rotatably positioned on the driving shaft 23a of the pinion 23. One of the two members of the ratchet coupling is non-rotatably connected to the gear 22 in the usual manner, while the other member is similarly connected to the driving shaft 23a of the pinion 23.

Driving power for the delayed-action device 19 to 30 is provided by a tension spring 33, one end of which is hooked onto a pin 31 of the driving segment 21, while the other end is attached to a fixed lug 32. The spring 33 is so arranged that it is able to exert a specific moment of rotation on the driving segment 21 and, at the same time, a constantly counterclockwise directed moment on the delayed-action device, urging the latter to pivot about pin 17. The rotational mobility of the delayed-action device may be small and may be limited by a projection 19a extending from the base plate 19 and engaging the inner wall of the shutter housing 1, as is especially apparent in FIG. 2.

In order to be able to keep the delayed-action device 19 to 30 in the cocked position shown in FIG. 1, a locking member 34 is rotatably positioned on the shaft 12. One arm 34a of the member 34 engages the arm 13a of the release lever 13, while another arm 34b, which faces the bearing plate 19, has a hook 34d and is provided with a slanting ride-up edge 34c. The hook 34d, in turn, cooperates with a second hook 19b on one of the two bearing plates 19. Associated with the member 34 is a spring 35 which tends to keep the member 34 in tensional engagement with the lever arm 13a.

The arrangement of the delayed-action device 19 to 30, in its entirety, with respect to the position of its driving spring 33 is such that the anchor 30, which is pivotally positioned on the bearing plates 19, engages the spring 33 and, consequently, meshes with the anchor wheel 29 when the delayed-action device is cocked. This, in turn, prevents the anchor wheel 29 as well as the pinions and gears 22 to 29, which are in gear connection with the anchor wheel 29, from rotating, and therefore the delayed-action device is blocked. The delayed-action device 19 to 30 is retained in this cocked position by the locking member 34, which releases the delayed-action device for operation only when the release lever 13 is actuated. During this operation, the delayed-action device 19 to 30, acted on by the tension spring 33, first pivots slightly about the pin 17 in the direction towards the housing wall 1 of the shutter until the projection 19a strikes the wall. Simultaneously with said pivoting motion, the escapement anchor 30 is released from engagement with the spring 33 so that the anchor wheel 28 as well as the gear chain 22 to 28 is able to run down under the influence of the spring 33.

For the purpose of cocking the delayed-action device 19 to 30 and its tension spring 33 the driving segment 21 is provided with a handle 21b. In addition, the driving segment 21 comprises an arcuate supporting edge 21c, which cooperates with a bent-off lug 8a of the driving ring 8 to prevent the ring, after the release of the intra-lens shutter or after a small initial movement, from moving further until the arcuate supporting edge 21c has moved past the bent-off member 8a. During this process, the handle 21b moves from the cocked position drawn in FIG. 1 to the end position indicated by broken lines.

When the shutter is in cocked position and if it is intended to effect delayed-action device exposures with the camera, the delayed-action device 19 to 30 must also be cocked. This is done by moving the handle 21b from the release position indicated by broken lines in FIG. 1 to the cocked position. Because of the engagement of the driving segment 21 with the pinion 23, this movement of the handle 21 exerts a moment of rotation on the delayed-action device 19 to 30 in its entirety, which results in a clockwise pivoting motion of the delayed-action device about the pin 17, causing the hook-shaped member 19b to ride up the slanting edge 34c of the locking member 34. This causes the locking member to be pivoted counterclockwise about the shaft 12 and finally to latch onto the hook-shaped member 19b, thus securing the delayed-action device 19 to 30 in the cocked position.

Figure 8:
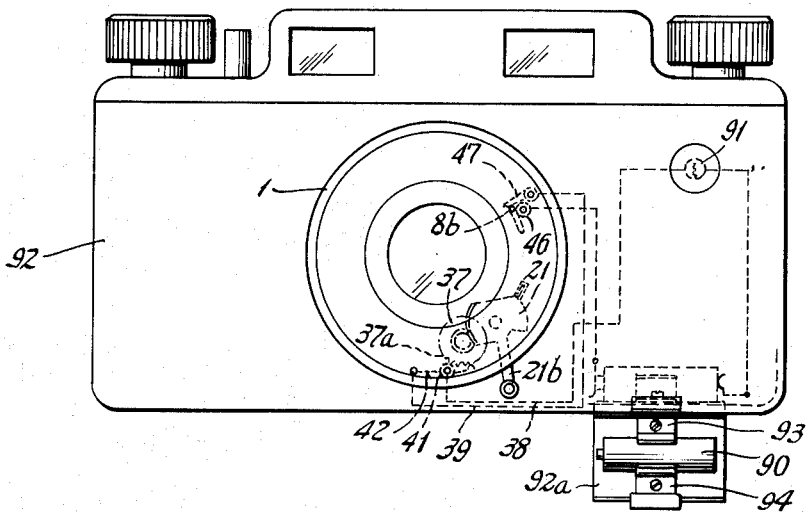
FIG. 8 is the front view of a photographic camera with an indicating lamp built into the camera case.
Figure 9:
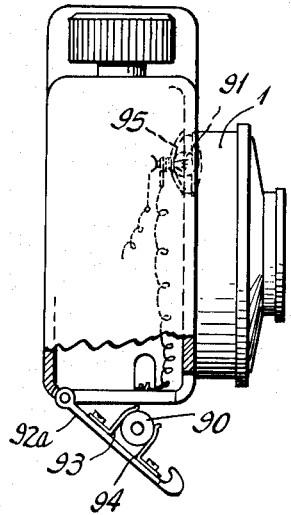
FIG. 9 is a side view of the camera according to FIG. 8.

In accordance with the invention an operating or control device is associated with the above described delayed-action device 19 to 30 to indicate the end of the running-down motion of the delayed-action device by causing a lamp to emit a light signal. In the embodiment illustrated in FIGS. 1 and 2, the operating device comprises a disc-shaped control member 37 which may be non-rotatably connected either to the pinion 23 of the delayed-action device or to the transmission shaft 23a thereof. Part of the circumference of the control member 37 is provided with operating or control cams, or serrations, 37a which operate a contact switch connected to a pair of wires 38 and 39. In order to obtain a comparatively simple and functionally dependable arrangement, the contact switch may be formed of a fixed insulated contact pin 41 and an insulated leaf spring 42 attached to the wall of the shutter housing 1. The free end of the leaf spring 42 rests on the circumference of the control disc 37 and has a bent-off member 42a. The contact switch is so located that when the disc 37 rotates, the operating cam 37a traveling past the leaf spring 42 causes the latter repeatedly to engage the pin 41, thus lighting up an indicating lamp 44 which is also connected to the wires 38 and 39. The current source used for this purpose may be a battery 45 built either into the housing 1 of the intra-lens shutter or into the case of the camera. Likewise, the indicating lamp 44 connected to the wires 38 and 39 may be arranged either in the front plate 1b of the shutter housing 1, as illustrated in FIGS. 3 and 4, or else in the camera case, as shown in FIGS. 8 and 9.

In order to cause the indicating lamp 44 to emit either a single light signal or group of light signals only once shortly before or upon completion of the running-down motion of the delayed-action device 19 to 30, the gear ratio between the toothed section 21a of the driving segment 21 and the pinion 23 of the gear chain 22 to 28 is so selected that the cams 37a enter the region of the leaf spring 42 only once during an entire revolution of the control disc 37, which revolution corresponds to the whole running-down motion of the delayed-action device.

In order to preserve the battery 45 which transmits current pulses to the indicating lamp 44, another switch is connected in series with the wires 38 and 39. As is shown in FIGS. 1 and 2, the additional switch comprises a fixed pin 46 arranged insulatedly in the housing 1 and an insulated, pivotally mounted contact lever 47. The contact lever 47 which is acted on by a spring 48, cooperates with a pin 8b of the shutter-blade driving ring 8, and does so in such a manner that the driving ring, when in its cocked position, disconnects the battery 45 from the wire 39 and, when outside its cocked position, automatically reconnects the battery to the wire by permitting the contact lever 47 to engage the pin 46.

Figure 3:
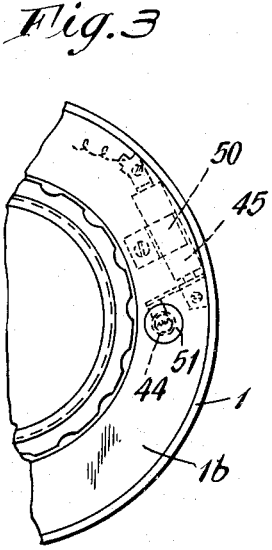
FIG. 3 is a partial front and top view of the housing of an intra-lens shutter, including an indicating lamp.
Figure 4:
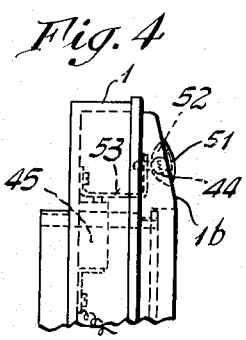
FIG. 4 is a side view of the housing of FIG. 3.

As is apparent from FIGS. 3 and 4, the indicating lamp 44 as well as the battery 45 may be arranged directly in the intra-lens shutter. For this purpose, the battery may be held by means of a clamp 50 within the shutter housing 1 and the indicating lamp 44 may be located on the front covering plate 1b of the shutter. In order to facilitate the changing of batteries, the shutter housing 1 may be provided with an access in the form of a slide or of a flap, while the indicating lamp 44, in order to be protected against damage, is covered by a meniscus lens 51 which is preferably made of transparent material. It is further of advantage if the indicating lamp 44 has a focusing reflector 52 which may be in direct contact with one of the two poles of the battery 45 by way of a strap 53.

When automatic-release exposures are carried out, the above-described delayed-action device, built into the housing of an intra-lens shutter and provided with the operating or control device according to the invention, operates in the following manner:

As shown in FIG. 1, both the shutter-blade driving mechanism 3 to 8 of the intra-lens shutter and the delayed-action device 19 to 30 are in cocked position. If the release member 13 is actuated in this setting position of the intra-lens shutter, the arresting lever 11 first releases the cocking and driving disc 4 and the locking member 34 to initiate operation of the delayed-action device. After a short initial motion, during which the shutter blades 2 remain closed, the lug 8a of the driving ring 8 engages the control edge 21c of the driving segment 21, as illustrated in FIG. 2. This causes the motion of the driving ring 8 to be interrupted temporarily until it is finally released by the delayed-action device 19 to 30. It is further apparent from FIG. 2 that the contact lever 47 has been forced by the spring 48 to follow the pin 8b of the shutter-blade driving ring 8. As a result, the lever 47 comes into engagement with the fixed contact pin 46, connecting the wires 38 and 39 to the battery. Shortly before the control edge 21c of the driving segment 21 has moved past the lug 8a of the shutter-blade driving ring 8, the cam 37a of the control disc 37 begins to actuate the leaf spring 42, thereby triggering one or a series of light signals in the indicating lamp 44, depending on whether there is one or a series of serrations in the cam 37a. When the cam 37a has moved past the leaf spring 42 and the control edge 21c of the driving segment 21 has thereby simultaneously moved past the lug 8a, the shutter-blade driving ring 8, traveling beyond the projection 21d of the driving segment 21 is released for further motion, during which the shutter blades 2 open and close again in the usual manner. As soon as the shutter-blade driving ring 8 impinges, at the end of its return motion, with its pin 8b on the contact lever 47, the supply of current from the battery 45 is automatically interrupted again. This occurs because the pin 8b, when in the end or final phase of its motion, lifts the contact lever 47 off the fixed pin 46.

Figures 6, 7:
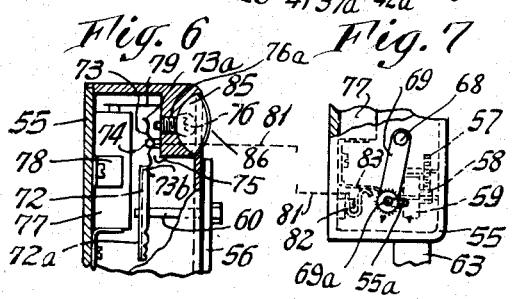
FIG. 6 is a partly cross-sectional side view of the upper portion of the delayed-action device of FIG. 5.
FIG. 7 is a side view of the lower portion of the delayed-action device of FIG. 5.
Figure 5:
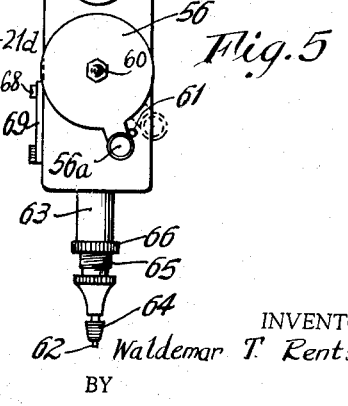
FIG. 5 is a top view of a delayed-action device which can be attached to the camera and which is also equipped with an indicating lamp.

FIGS. 5 to 7 illustrate a delayed-action device of known construction which can be attached to a photographic camera and which is also equipped with an operating or control device according to the invention. This delayed-action device consists substantially of a gear chain (not shown in the drawing) arranged within a housing 55. For simplicity's sake, only the cocking and driving disc 56, two gears 57 and 58 of the gear chain, and the fan-blade motion regulator 59 which is connected to said disc 56 by way of gears 57 and 58 are shown in the drawings. In the embodiment according to FIGS. 5 to 7, the cocking and driving disc 56 is rigidly connected to a shaft 60 and is provided with a handle 56a which, as is shown in FIG. 5, engages a fixed pin 61 when in cocked position. The disc 56 rotates in clockwise direction when the delayed-action device is running down until it reaches the end position indicated by broken lines. For the purpose of guiding a pressure pin 62 cooperating in a well known manner with the gear chain 56 to 58 of the delayed action device 55 as well as with the release mechanism of the shutter of the camera, a bushing or sleeve 63 is arranged on the housing 55 and is provided with a threaded nipple 64 for attaching the delayed-action device to the camera. For the purpose of setting the pressure point of the pin 62, the threaded nipple 64 is settable by means of a threaded section 65 with respect to the bushing 63 and can be secured, in the setting position selected, by means of a knurled nut 66.

The cocked delayed-action device 55 is secured as well as released with the aid of a release lever 69 pivotally positioned on an axle 68. The lever 69 has a pin 69a which is guided on a slot 55a of the housing 55 and can be moved into the plane of motion of the fan-blade motion regulator 59 for the purpose of blocking the delayed-action device 55. In this case, the release lever 69 occupies the setting position marked "Stop." In order to initiate operation of the delay-action device 55, the release lever 69 is merely pivoted to the left into the setting position marked "Start," and the pin 69a is thereby moved out of the plane of motion of the fan-blade motion regulator 59.

As is especially apparent from FIG. 6, the above described delayed-action device 55 is also provided with a control device which includes a disc 72 which rotates with the gear or transmission chain 56 to 58 of the delayed-action device. The control disc 72 has a ridged surface 72a and is rigidly connected to the shaft 60 of the cocking and driving disc 56. A two-armed contact lever 73 cooperates with the control disc 72. The contact lever 73 is also rotatably positioned about an axis 74 and is acted on by a spring 75 which keeps the lever arm 73b in engagement with the control disc 72, while the other lever arm 73a makes contact with the indicating lamp 76 installed at the front of the housing of the delayed-action device 55. The source of current may be a battery 77 which is fixed inside the delayed-action device 55 by means of clamps 78. One of the poles of the battery is connected by a strap 79 to the socket 76a of the indicating lamp 76. The other pole of the battery 77 is connected to a switch which interrupts the battery current to the operating device whenever the delayed-action device is not in use.

The interrupter switch may, for example, consist of a contact spring 82 which is connected to the two-armed contact lever 73 by a wire 81 and with which is associated another contact spring 83 engaging a pole of the battery 77. The free end of the contact spring 83 projects into the path of motion of the pin 69a fixed on the release lever 69, so as to be lifted off the contact spring 82 when the release lever 69 is in the "Stop" position. When the release lever is in the "Start" position, the free end of the springs 82 and 83 again are in contact. This arrangement ensures that the current supply from the battery 77 to the indicating lamp 76 is interrupted automatically when the delayed-action device 55 is cocked. The indicating lamp 76 together with its reflector 85 is built into the front side of the housing 55 and is preferably also protected against external harmful influences by a meniscus lens 86.

The mode of action of the delayed-action device of FIGS. 5 to 7 is as follows:

In order to release the delayed-action device 55 from its cocked position, the release lever 69 must first be moved from the "Stop" position to the "Start" position, thereby moving the contact spring 83 to the setting position shown in FIG. 7 and releasing the cocking and driving disc for rotation. Shortly before the cocking arm 56a of the driving disc 56 has reached the fixed stop 61 in the course of its rotary motion, the ridges or serrations 72a of the control disc 72 slide along the contact lever 73. As a result the contact lever 73 closes intermittently the circuit of the indicating lamp 76, which thereby indicates the end of the delay period of the delayed-action device 55 by repeated flashes.

FIGS. 8 and 9 illustrate a photographic camera with an intra-lens shutter which is provided with an operating or control device 37, 37a developed according to the invention. In this embodiment both a battery 90 and an indicating lamp 91 are built into the camera case or housing 92. Preferably the battery 90 is arranged on a flap 92a pivotally positioned on the underside of the camera case 92 so that it can be exchanged readily by means of two resilient clamps. In addition, this arrangement provides for mounting the indicating lamp 91 with its reflector 95 on the front side of the camera case 92.

I claim:

1. The combination of: a delayed-action device for delaying operation of the shutter of a photographic camera for a delay period; a control member connected to said device to move therewith; a signal light; first switch means electrically connected to said light and comprising a relatively fixed contact pin and a leaf contact spring; at least one serration on said control member to engage said spring and bring it into contact with said pin near the end of said delay period to flash said light to indicate the end of said delay period; and second switch means electrically connected in circuit with said light and said first switch means, and comprising a movable contact engaging said shutter to move therewith to close said second switch means only after said shutter has undergone an initial movement at the beginning of said delay period.

2. The combination of: a delayed-action device for delaying operation of the shutter of a photographic camera for a delay period; a control member connected to said device to move therewith; at least one serration on said control member; a signal light; first switch means comprising a two-armed lever, one of said arms engaging said control member; a spring to hold said one arm in engagement with said control member, the other of said arms engaging one terminal of said lamp, said serration being located to operate said switch and flash said light near the end of said delay period; and second switch means electrically connected in circuit with said light and said first switch means, and comprising a movable contact engaging said shutter to move therewith to close said second switch means only after said shutter has undergone an initial movement at the beginning of said delay period.

3. The combination of: a delayed-action device for delaying operation of the shutter of a photographic camera for a delay period; a single light; first switch means operated by said delayed-action device near the end of the delay period for energizing said light; and second switch means electrically connected in circuit with said light and said first switch means, and closed automatically at the beginning of said delay period, said second switch means comprising a first contact engaging said shutter to move therewith, and a fixed contact close to said first contact to make connection therewith only after said shutter has undergone an initial movement.

4. The combination of: a delayed-action device for delaying operation of the shutter of a photographic camera for a delay period; a signal light; first switch means operated by said delayed-action device near the end of the delay period for energizing said light; and second switch means electrically connected in circuit with said light and said first switch means, and closed automatically at the beginning of said delay period, said second switch means having a movable contact and said delayed-action device having a release lever movable from a "Stop" position to a "Start" position, said lever engaging said movable contact and holding said second switch open when said lever is in the "Stop" position, and closing said second switch when said lever is in the "Start" position.

References Cited by the Examiner
UNITED STATES PATENTS

| | | | |
|---|---|---|---|
| 924,465 | 6/1909 | Hubscher | 95—53.6 |
| 1,671,644 | 5/1928 | Josepho | 95—11.5 |
| 2,461,185 | 2/1949 | Schubert | 88—24 |

JOHN M. HORAN, *Primary Examiner.*

NORTON ANSHER, *Examiner.*